United States Patent [19]

Tulpule et al.

[11] Patent Number: 4,980,824
[45] Date of Patent: Dec. 25, 1990

[54] EVENT DRIVEN EXECUTIVE

[75] Inventors: Bhalchandra R. Tulpule, Vernon; Robert E. Collins, East Hartford; John Cheetham, Bristol; Smith Cornwell, East Granby, all of Conn.

[73] Assignee: United Technologies Corporation, Hartford, Conn.

[21] Appl. No.: 298,291

[22] Filed: Jan. 17, 1989

Related U.S. Application Data

[63] Continuation of Ser. No. 924,542, Oct. 29, 1986, abandoned.

[51] Int. Cl.$^5$ .............................................. G06F 9/00
[52] U.S. Cl. ................................ 364/200; 364/965.4; 364/948.3
[58] Field of Search ................................ 364/200, 900

[56] References Cited

U.S. PATENT DOCUMENTS

| | | | |
|---|---|---|---|
| 4,152,761 | 5/1979 | Louie | 364/200 |
| 4,153,932 | 5/1979 | Dennis et al. | 364/200 |
| 4,286,322 | 8/1981 | Hoffman et al. | 364/200 |
| 4,320,451 | 3/1982 | Bachman et al. | 364/200 |
| 4,320,455 | 3/1982 | Woods et al. | 364/200 |
| 4,333,144 | 6/1982 | Whiteside et al. | 364/200 |
| 4,369,494 | 1/1983 | Bienyenu et al. | 364/200 |
| 4,394,727 | 7/1983 | Hoffman et al. | 364/200 |
| 4,394,730 | 7/1983 | Suzuki et al. | 364/200 |
| 4,413,318 | 11/1983 | Herrington | 364/200 |
| 4,414,624 | 11/1983 | Summer, Jr. et al. | 364/200 |
| 4,447,874 | 5/1984 | Bradley et al. | 364/200 |
| 4,468,736 | 8/1984 | De Santis et al. | 364/200 |
| 4,494,188 | 1/1985 | Nakane et al. | 364/200 |
| 4,525,780 | 6/1985 | Bratt et al. | 368/200 |
| 4,590,555 | 5/1986 | Bourrez | 364/200 |
| 4,594,655 | 6/1986 | Hao et al. | 364/200 |
| 4,615,001 | 9/1986 | Hudeins, Jr. | 364/200 |
| 4,658,351 | 4/1987 | Teng | 364/200 |
| 4,675,806 | 6/1987 | Uchida | 364/200 |
| 4,736,318 | 4/1988 | Delyani et al. | 364/200 |

OTHER PUBLICATIONS

IBM Corporation Programming Publications, "OS/VS2 MSV Overview," Second Edition (May 1980), Chapters 5-6.

Primary Examiner—Gareth D. Shaw
Assistant Examiner—John G. Mills
Attorney, Agent, or Firm—Francis J. Maguire, Jr.

[57] ABSTRACT

Tasks may be planned for execution on a single processor or are split up by the designer for execution among a plurality of signal processors. The tasks are modeled using a design aid called a precedence graph, from which a dependency table and a prerequisite table are established for reference within each processor. During execution, at the completion of a given task, an end of task interrupt is provided from any processor which has completed a task to any and all other processors including itself in which completion of that task is a prerequisite for commencement of any dependent tasks. The relevant updated data may be transferred by the processor either before or after signalling task completion to the processors needing the updated data prior to commencing execution of the dependent tasks. Coherency may be ensured, however, by sending the data before the interrupt. When the end of task interrupt is received in a processor, its dependency table is consulted to determine those tasks dependent upon completion of the task which has just been signalled as completed, and task dependency signals indicative thereof are provided and stored in a current status list of a prerequisite table. The current status of all current prerequisites are compared to the complete prerequisites listed for all affected tasks and those tasks for which the comparison indicates that all prerequisites have been met are queued for execution in a selected order.

3 Claims, 8 Drawing Sheets

EVENT DRIVEN EXECUTIVE

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

This application is a continuation of Ser. No. 924,542, filed Oct. 26, 1986, and now abandoned.

CROSS REFERENCE TO RELATED APPLICATION

The invention described herein may employ some of the teachings disclosed and claimed in commonly owned co-pending application filed on even date herewith by Tulpule et al, Ser. No. 06/924,646, now abandoned and refiled as Ser. No. 07/355,070 entitled n-DIMENSIONAL MODULAR MULTIPROCESSOR LATTICE ARCHITECTURE, which is hereby expressly incorporated by reference.

1. Technical Field

This invention relates to event driven executives for signal processors.

2. Background Art

In recent years, there has been an increase in the demand for high performance, real-time digital computer systems capable of solving complex control problems demanding high throughput. The designers of high performance digital computer systems have resorted to multiprocessor architectures such as systolic, processor array systems, pipelined systems, or multiprocessor networks in an attempt to meet the demand. In most of these systems, the arrays of processors share in the total workload. Each processor performs the same set of tasks and operates on the corresponding data sets under the direction of a system controller. In many systems, such as network processors, each processing element controls and operates on its own internal data and communicates with other processors for data and execution flow and control purposes.

In most real-time critical multiprocessor systems, there is usually a concurrent need for minimizing the overall computational delay. The computational delay in a multiprocessor system depends on the worst case, critical path task times in the processors, as well as the interprocessor data handling delays. The need for minimizing transport delay, therefore, translates to the need for an operating system or task executive that can efficiently interface with many tasks, both internal and external to the local processing element, and minimize the intertask handling of data and control signals.

In the prior art, the operating systems implemented for real-time control applications were based on a real-time executive in which real-time events were carefully laid-out or "scheduled" to begin a sequence of timed tasks. In such an executive, any significant growth in the execution time of a task, during the design period, usually led to repartitioning of the real-time tasks and/or resulted in significant redesign cost. Furthermore, the prior art executives were incapable of dynamically adjusting to the not completely predictable or variable times of occurrences of external events in other processors in a multiprocessor system.

DISCLOSURE OF THE INVENTION

An object of the present invention is to provide a scheme for an event driven executive for a signal processor.

Another object of the present invention is to provide an efficient task executive which fulfills the need to balance, partition and repartition tasks between processors in a multiprocessor system in order to balance the critical parameters such as path times, transport delays and throughput throughout the multiprocessor system.

Still another object of the present invention is to provide a task executive for starting, suspending and/or stopping tasks and initiating new tasks after determining their priority and precedence.

Still another object of the present invention is to provide a task executive in a multiprocessor system which, in taking account of task dependencies and prerequisites, manages data and control flow signals in order to timely and coherently provide required input data for a task to the processor which requires that data in order to properly execute the task.

Another object of the present invention is to provide a task executive for a multiprocessor system which takes into account an architecture in which a given dependent task may require several prerequisite tasks to be completed in local or any other processors before being executed.

Another object of the present invention is to provide a task executive for a multiprocessor system which is flexible enough to be changed around either during the design process or dynamically in response to changes in the execution times of tasks which can change significantly during execution.

Another object of the present invention is to provide a simple, low overhead task executive for a multiprocessor system.

Another object of the present invention is to provide a task executive for a multiprocessor system in which interprocessor interrupts and data blocks are efficiently handled.

Another object of the present invention is to provide a task executive for a multiprocessor system which avoids log jams and hidden transport delays endemic to prior art multiprocessor systems.

Another object of the present invention is to provide a task executive for a multiprocessor system which optimizes time critical paths.

Another object of the present invention is to provide for ease of relocateability of tasks in a multiprocessor system, as between processors.

Another object of the present invention is to provide for efficient handling of pass-through data and control signals between several processors.

According to the present invention, an event driven task executive for a signal processor determines whether an end of task signal has been generated and then consults a dependency table in order to determine those tasks which depend upon completion of the completed task represented by the end of task interrupt signal and then updates a current status list of prerequisites completed for each such task and compares the updated current status list to a prerequisite list for each such task; those tasks for which all prerequisites are met are queued for execution in a selected order.

In further accord with the present invention, task precedences and signal dependencies may be expressed graphically in terms of a design aid called a precedence graph; thus, the tasks are illustrated interdependently in terms of completion of one task as being a prerequisite to execution of a subsequent task. The executive is then designed to operate in conformance with the precedences and interdependencies laid out in the precedence graph. When a task is completed, an end of task signal is triggered and provided to the executive in order to indicate a completed task which is a prerequisite to commencement of execution of another, dependent task. Any updated data, resulting from the completion of the task is provided for use by the subsequent task, if applicable. The executive determines from a dependency table those tasks which depend upon completion of the task represented by the end of task interrupt signal. Current status signals are generated according to this determination for the purpose of updating the current status of the prerequisites for each task. The current status is stored in a current status list of a task prerequisite table. Thus, all tasks yet to be executed which are dependent on the completion of the task represented by the end of task interrupt signal have the current status of their prerequisites updated, with respect to that task, in the current status list of the prerequisite table. Tasks for which all prerequisites have been met are queued for execution in a selected order.

In still further accord with the present invention, task precedences and signal dependencies in a multiprocessor system in which tasks are partitioned between processors may be expressed graphically in terms of a design aid called a precedence graph; thus, the assigned tasks are illustrated interdependently in terms of tasks being assigned among various signal processors in the multiprocessor system and in terms of interrupts and transfer of data between processors at the proper time. The executive is then designed to operate in conformance with the precedences and interdependencies laid-out in the precedence graph. When a task completes, an end of task signal is triggered and provided to the executive which in turn provides an end of task interrupt signal to another processor, the completed task being a prerequisite to commencement of execution of another, dependent task in the other processor. Updated data, resulting from the completion of the task in the processor providing the interrupt signal is transferred to the other processor at the time of completion of the task. Coherency of data transferred may be ensured by sending the data prior to generating the interrupt. When the executive in each processor receives the end of task interrupt signal either from one of its own tasks or from another processor in the multiprocessor system, it determines from a dependency table those tasks which depend upon completion of the task represented by the end of task interrupt signal. Current status signals are generated according to this determination for the purpose of updating the current status of prerequisites for each task. The current status signals are stored in memory as a current status list of a task prerequisite table. Thus, all tasks yet to be executed which are dependent on the completion of the task and the associated end of task interrupt signal have the current status of their prerequisites updated, with respect to that task, in the current status list of the prerequisite table. Tasks for which all prerequisites have been met are queued for execution in a selected order.

In further accord with the present invention, in a multiprocessor system, the architecture may be such that data cannot be transferred directly from one processor to another either due to lack of a direct path or failure thereof; in such a case, according further to the present invention, the data must instead first pass through one or more other processors or associated memory devices. In such an architecture, the intermediary processor or processors or their associated memory devices will serve as intermediaries for the reception of a task interrupt signal and its associated updated data relating to the completion of the task from the source processor to the destination processor. In such a case, the source processor will send an interrupt which is received by the intermediary and which also receives the updated data. After reception of the data, the intermediary sends the task interrupt signal and data to the destination processor which then receives the interrupt and the data. Such "handoffs" of interrupts and data may be chained in cases where several processor boundaries must be crossed.

In still further accord with the present invention, the tasks scheduled for execution, for which all prerequisites have been met, may be scheduled in a plurality of task execution queues. The number of execution queues will be greater than or equal to the number of different task rates for the control system. In other words, there may be several layers of tasks being accomplished at different rates within the control system. Each control rate may have one or more queues associated with it. The reason for the additional queues within a given task rate is that in many cases, one set of tasks are considered more time critical and, therefore, their overall transport delay must be minimized. Of course, the order of execution of queued tasks may be selected according to other types of criteria or as dictated by other priorities.

In order to effectively utilize the possible growth and to achieve the flexibility and other desirable capabilities of multiprocessor architectures, such as the architectures pictured without limitation in FIGS. 1 and 2 below, a new approach, according to the present invention, is required for the design of the executive.

This is particularly true in a particular class of problems where the computational tasks are irregular and each processor operates differently on a different data base; in other words, where non-homogeneous data bases are present within a heterogeneous multiprocessor architecture. That class of problems requires real-time, sequential computations which are capable of making data dependent decisions and branching off in non-regular patterns. Therefore, there is a need for a versatile multiprocessor system architecture and task executive that can meet the changing, real-time applications for such problems by efficiently performing large and ever-changing complex computations in a sequential manner.

The throughput requirements of these irregular, real-time computational applications are very large and complex and can change drastically from application to application. The full range of arithmetic and data manipulation, as well as input-output signal handling capabilities required, can also change drastically, according to application. In many cases, the computational complexities are due to the presence of intertwining, looping and mixing of data flow paths between functions. The data flow paths and task executions depend on the mode of operation and serial, data driven decisions.

The need for high throughput is synonomous with the need for performing a given task within a given time with a minimum waiting time. For example, in avionic real-time control systems applications, the computational transport delay requirements are extremely stringent since they determine the performance and capabilities of the system in terms of bandwidth, as well as the failure management and reliability qualities of the overall system. The use of multiprocessors stretches the data and execution flow across processor boundaries and becomes an added factor contributing to the overall transport delay. The need for reducing this additional transport delay is thus closely associated with the requirement of efficient and high bandwidth communication between the interprocessor data elements. A high communication bandwidth capable of rapidly transferring a large number of signals is particularly necessary because of the presence of irregular and unpredictable data and execution flows spread across the multiprocessors.

A given computational task to be executed in multiprocessor architectures, e.g., such as are illustrated, without limitation, in FIGS. 1 and 2, can be approached using a number of different methods. A straightforward approach would consist of using one or two processors for the management of input data and using several other processors for most of the computational tasks. Output voting planes and built-in-test tasks could then be performed by the input/output processors. The problem with this approach is that it does not efficiently utilize all of the processors all of the time. Some processors may be under utilized while some others may run out of real-time.

Further improvement in effective throughput requires a different scheme in which tasks can be selected to be performed in parallel without significant software overhead in the executive. Such an approach to the design of the task executive involves splitting and merging of critical, interdependent tasks for the purpose of balancing the overall computational burden. However, this calls for a fair amount of sophistication in the executive requiring a potentially significant overhead.

Another, perhaps more important reason for requiring a sophisticated executive, is the problem of log jam in which the data and control dependencies can force processors to wait for each other. This is a particularly difficult situation to predict, test or simulate for in a system consisting of more than two processors. If allowed to develop, it could lead to catastrophic results. Other, more subtle forms of log jams can lead to unnecessary and hidden transport delays in the execution of critical timing paths. This problem is caused by inefficient techniques of scheduling tasks which have met their prerequisites, i.e., which are ready to go. Another source of large transport delay, is the lack of efficient techniques for passing data between processors.

The event driven executive for a multiprocessor system, according to the present invention, has the very important advantage of being unaffected by design changes which might in turn affect the execution times of tasks. An event driven executive remains unaffected by these changes because its execution sequence depends only on the task dependency specified by the precedence graph.

The problem of obtaining a high overall throughput in a multiprocessor system is solved, according to the present invention, by using a flexible, event driven executive that utilizes a precedence graph for outlining task definition for efficient execution of the workload.

Each modular processing element (e.g., 12) includes a signal processing entity 24 (referred to as "SP"), having data lines 26, address lines 28, and control lines 30 connected to a ring bus 32.

An event driven executive for a multiprocessor system, according to the present invention, provides the flexibility of implementation lacking in real-time executives and is a key element essential for the effective utilization of multiprocessor architectures.

In still further accord with the present invention, the occurrence of each event suspends the present task for a review of the relative priorities of the currently suspended task and the new task(s) for which the event is a prerequisite. A task of the highest priority, which has also met all its prerequisites, is then searched for and, if found, it is then invoked for execution. If not found, the currently suspended task is re-entered. Thus, dynamic changes in the relative timings of tasks do not affect the executive. The executive can also be easily changed during the design process to reflect a new precedence graph by simply changing the prerequisite and dependency tables.

The present invention provides a generic executive for all configurations and requirements which is driven by tables of precedences and dependencies based on a precedence graph of tasks and signals. The executive is dynamically independent of task timings. It provides the flexibility needed for design changes which often, in the design process of the prior art, resulted in architectural upheavals at very high cost. The present invention provides the ability to easily optimize any and all critical paths. Moreover, efficient handling of interprocessor interrupts is provided. Data signals between processors are transferred in a coherent manner simply by sending the data before the interrupt and at the same time eliminating the need for polling and its associated inefficiencies and the potential for lock-ups is also thereby eliminated. Pass through tasks are also efficiently handled. Traceability and monitoring of normal task completion events is assured. Fault tolerance for abnormal events is an additional feature of the present invention.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
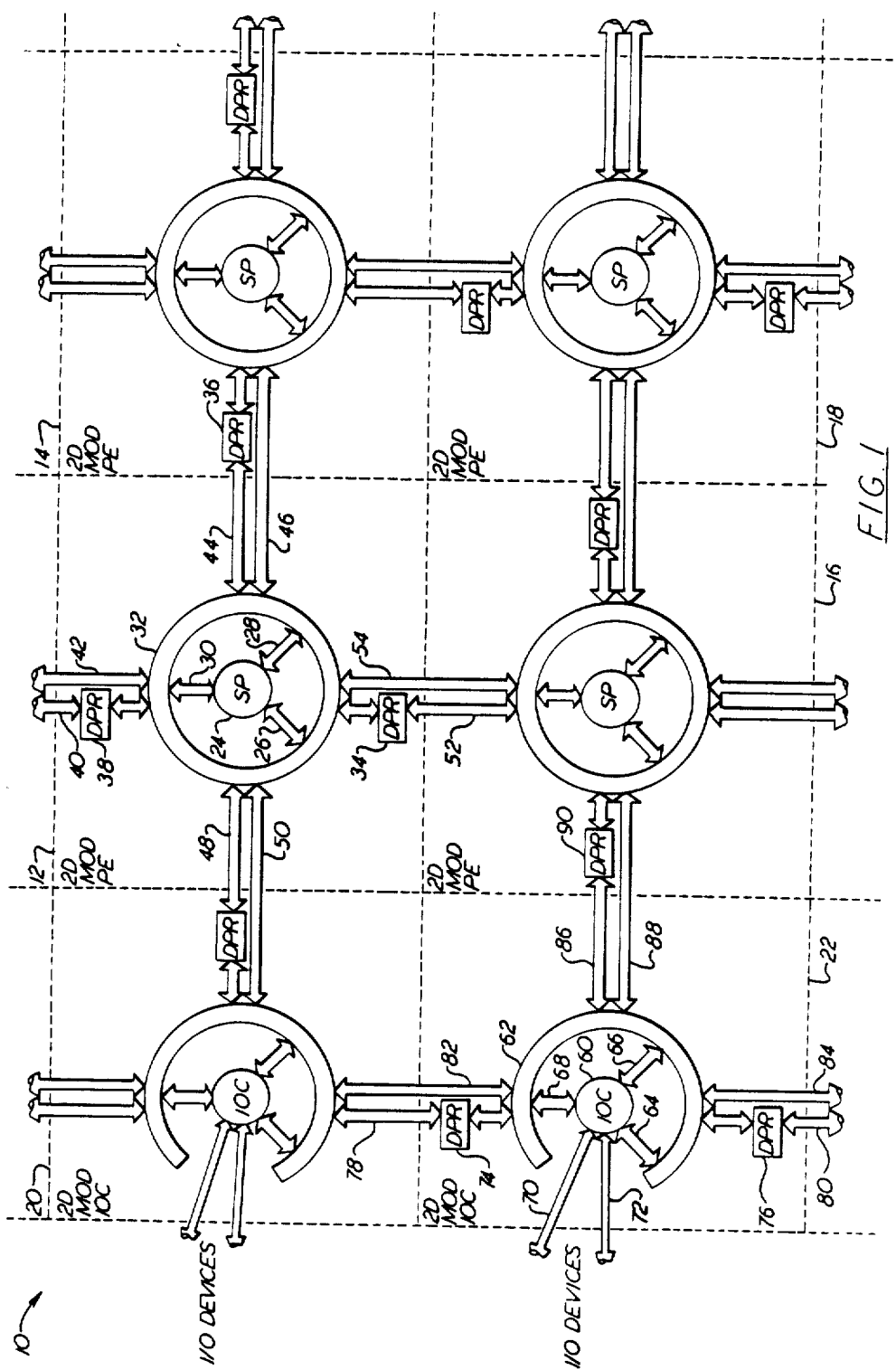
FIG. 1 is a pictorial representation of a two dimensional multiprocessor lattice architecture in which a multiprocessor task executive according to the present invention may be utilized.

FIG. 1 is a pictorial representation of a two-dimensional multiprocessor lattice architecture 10. A number of two-dimensional modular processing elements 12, 14, 16, 18 are illustrated connected to one another in a manner to be described in more detail below. The number of processing elements is at least two but may be any number.

Figure 2:
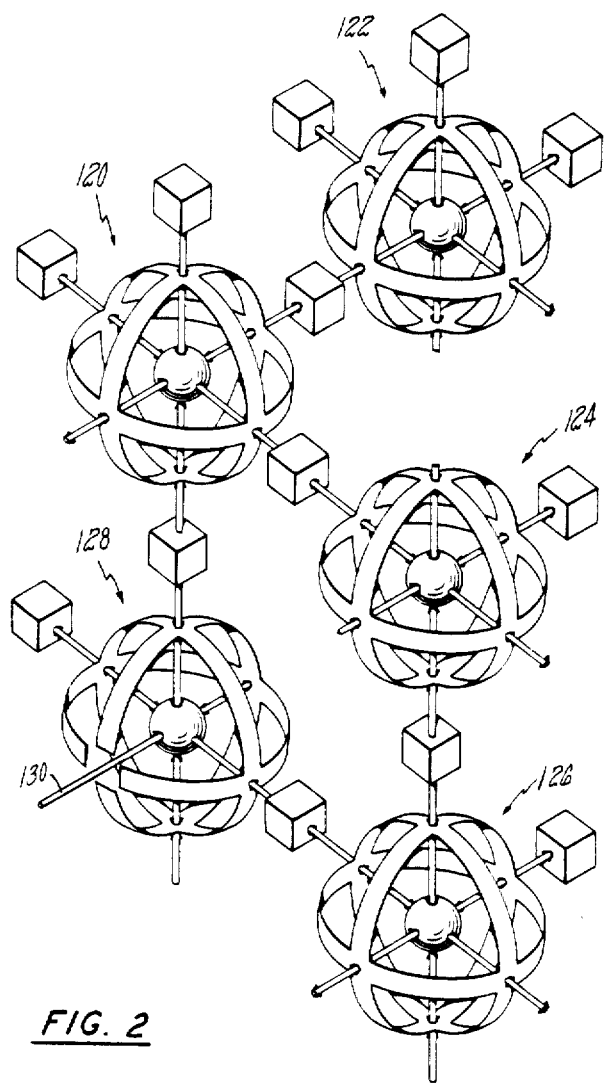
FIG. 2 is a pictorial representation of a three dimensional multiprocessor lattice architecture in which a multiprocessor executive according to the present invention may be utilized.

It should be understood that the architectures depicted, in both FIGS. 1 and 2 are not presented by way of limitation since the event driven multiprocessor task executive disclosed herein is broadly applicable to a wide range of different entities, from a mere individual "uniprocessor" to a general multiprocessor system.

A two-dimensional modular input/output controller (IOC) 20, as shown in FIG. 1, may be used in the two-dimensional multiprocessor lattice architecture 10. Such an IOC serves the purpose of communicating data and control signals between the outside world and the multiprocessor architecture. Additional IOCs may be utilized as is indicated by an additional IOC 22, which helps to share the input/output task load. It may be advantageous from the point of view of modularity to have both modular processing elements and modular IOCs for use as symmetrical building blocks in the lattice architecture 10. This does not necessarily imply, however, that such building blocks would be used, or if used, that they would operate identically. In other words, a heterogeneous multiprocessor system is contemplated to be within the scope of the present invention.

As mentioned above, the task executive of the present invention may be used in an architecture such as shown in FIG. 1, but the present invention is not restricted thereto, although it is particularly advantageous therein, as will be discussed in greater detail below.

In a two-dimensional architecture each two-dimensional modular processing element 12, 14, 16, 18 should, optimally, have four ports. Such are shown in FIG. 1 as emanating from, e.g., the ring bus 32 and exiting the modular processing element 12, through each of the four sides of the dashed lines which indicate the boundaries of the modular processing element. It will be understood that an actual circuit implementation of the two-dimensional multiprocessor lattice architecture (or, for that matter, an any dimension architecture) need not have any relation to the square shapes shown in FIG. 1 since the circuits can be mounted on printed circuit boards inserted into a chassis with other circuit boards. The interconnections in such a case will not be so simple or symmetrical as illustrated here. Thus, these Figures will, for many cases merely be pictorial and functional representations which aid in the presentation of the concepts involved.

The two-dimensional lattice architecture pictured in FIG. 1 relies on a dedicated memory storage area between each modular entity and every other modular entity with which it communicates in the lattice. This dedicated function can most effectively be implemented by a dual port random access memory (DPR). Of course, a DPR is not absolutely essential since memory arbitration using more traditional memory devices could be accomplished in lieu thereof.

If modularity is desired for each of the two-dimensional modular processing elements 12, 14, 16, 18, it will be best to provide two dual port RAMs per modular processing element. The other two ports in each element will not have a dual port RAM since they will be interfacing with other modular processing elements which do. The symmetry of processing elements constructed in this manner are most advantageous as may be illustrated in FIG. 1. There, it will be observed that modular processing element 12 has a "South" port with a DPR 34 which interfaces with a "North" port of modular processing elements 16, which does not have a DPR associated with it. Similarly, the "Eastern" port of modular processing element 12 does not have a DPR associated with it but the "Western" port of modular processing element 14 does have a DPR 36 associated with it. In this way, the symmetry of the modular processing elements 12, 14, 16, 18 enhances the facility with which a multiprocessor lattice may be constructed, in which each modular processing element communicates with another modular entity, in general, through a dedicated DPR. Of course, the symmetry of the individual processing elements could be different than shown.

The "Northern" port of modular processing element 12 contains a DPR 38 having data and address lines 40 emanating therefrom for connection to another modular entity (not shown). Of course, it will be understood that the data and address lines 40 need not necessarily be connected to another modular entity since the boundaries of the architecture must end somewhere. Control lines 42 also emanate from the ring bus 32 for communication across the "Northern" boundary for the modular processing element 12. Such lines are not absolutely necessary but would normally consist of hard wired interrupts. Such interrupts can also pass through the DPR rather than being routed separately.

The "Eastern" boundary of the modular processing element 12 is shown having data and address lines 44 and control lines 46 emanating from the ring bus 32 for connection to the "Western" boundary of processing element 14, including DPR 36.

Similarly, the "Western" boundary of entity 12 is illustrated having data and address lines 48 and control lines 50 emanating from the ring bus 32.

The "Southern" boundary of the modular processing element 12 has a port which interface with data and address lines 52 which interface with the ring bus 32 via the DPR 34. Control lines 54 provide the hard wired interrupts to the adjacent modular processing element 16.

It will be observed that the modular symmetry of the modular IOC 20, with respect to the number of DPRs contained therein, is different from that of the modular IOC 22. This showing is merely illustrative, however, as it will be realized that once a particular symmetry is selected for either an IOC or SP there will be little incentive to have another symmetry available. This is not to say, however, that one or more different symmetries of either IOCs or SPs cannot be used in the same architecture. For example, two types of SPs could be used, one having three DPRs and another having one only. Furthermore, the processing entities themselves may all have different processors or processor structures in them with interfaces that are uniform across the system.

The modular IOC 22 of FIG. 1 comprises a central input/output controller (IOC) 60 surrounded by a ring bus 62 which communicates with data lines 64, address lines 66, and control lines 68 emanating from the IOC 60. It will be observed that the ring bus 62 for the IOC 22 is slightly different from the ring bus 32 in that it comprises a "broken circle" with a gap through which a pair of data lines 70 and control lines 72 emanate at the "Western" port of the modular IOC 22 for communicating with I/O devices in the outside world.

At the "Northern" and "Southern" boundaries of the modular IOC 22 there exist ports having dedicated memories 74, 76 which may be DPRs, and which may be used to communicate with other modular entities in the lattice architecture via data and address bus lines 78, 80 and control lines 82, 84, respectively. The "Northern" boundary communicates with IOC 20. The modular entity, if any, communicating with its "Southern" boundary is not shown but may be an empty slot, another modular IOC, or a modular processing element.

At the "Eastern" boundary of the modular IOC 22 there is shown a port having data and address lines 86 and control lines 88 for communicating with an adjacent modular entity. There is no dedicated memory associated with the "Eastern" port of this particular modular IOC since, as shown in FIG. 1, it is used in an application in which the adjacent modular processing element 16 already has a dedicated memory 90.

FIG. 2 illustrates a three-dimensional lattice architecture using several three-dimensional modular processing elements 120, 122, 124, 126 and a three-dimensional modular IOC 128. The four modular entities 120, 124, 126, 128 can be pictured as lying in the same plane while the modular entity 122 can be pictured as lying in another plane, parallel to and behind the front plane. Other modular entities can be imagined lying in the same plane with entity 122 but are not shown for the sake of simplicity. Each of the modular entities in the three-dimensional lattice is connected to one or more adjacent modular entities via dual port RAMs (DPRs). These are shown as cubes in FIG. 2 and are interconnected between modular entities with dedicated address, data and control lines. Each of the entities is illustrated as being surrounded by a "ribbon" bus for address, data and control lines. It will be observed that the IOC 128 has its data, address and control "ribbon" lines broken at one point to permit communication with the outside world via lines 130 which would be similar in function to lines 70, 72 the two dimensional case shown in of FIG. 1. The three-dimensional lattice architecture of FIG. 2 is also similar to that of FIG. 1 except for the added dimension. Of course, it will be realized that the lattice architecture may be extended to any number of dimensions which will not be pictured here because of the difficulty of pictorially showing more than three dimensions.

As mentioned above, the architectures illustrated in FIGS. 1 and 2 are presented not by way of limitation but merely as an aid to the reader in understanding the context in which the task executive of the present invention may be utilized. Thus, it will be understood that the task executive presented and claimed herein may simply be used on a single processor and, furthermore, is not restricted in application to the types of architectures shown in FIGS. 1 and 2 but is broadly applicable to other architectures as well.

In breaking up a computational job into small units, the smallest individual unit of software module(s) plus data and control blocks which may be located in a selected processor is defined as a task. For example, in avionics control systems, signal management of a sensor set would be defined as a task; a triplex signal selection subroutine may not be defined as a task but would instead be defined as a component or subtask to be joined with other subtasks to make up a task. It should be noted that the definition of a task is not necessarily a firm one. It requires the tradeoff of modularity and executive overhead for processing. Since the executive overhead directly depends on the number of tasks in the precedence graph, a "small" number is usually desirable.

A precedence graph shows the interrelation a job subdivided into a set of tasks. In other words, a precedence graph specifies the dependencies and prerequisites of each task. An example of a precedence graph is provided in FIG. 3. In this Figure, a task 142, labelled "A" is started by an "external" event, not specified, but which may generally be indicated by an ENTER step 140. Tasks 143, 144, 146, respectively labelled, "B", "C", and "D" depend on task A. However, only tasks B and C can be started by task A because task D also depends on task B. Similarly, the final task 148, labelled "E", depends on tasks D and C. Tasks B and C are to be performed by processors P2 and P3, respectively, with processor P1 handling the rest. The overall task precedence can be represented by one graph for all of the tasks to be completed by all the processors in a given time frame. Thus, at the end of executing the task E shown in FIG. 3, a step 150 will be executed in which an exit is made. In the normal course of events, the step 140 would be re-entered at some point, at which time all of the tasks A, B, C, D, and E would be re-executed. This process could go on ad infinitum. It will be understood that the broadest claims of the present invention are not restricted to a task executive for a multiprocessor system. Thus, for the single processor case, the tasks of FIG. 3 would not be split between three processors but would be executed, according to the present invention, using a task executive operating with one processor.

In any multiprocessor architecture, such as are illustrated in FIGS. 1 and 2, there will normally be various types of interrupts which must be handled. Such interrupts might include a macrosync (MS) type of interrupt which indicates the beginning (or end) of a repetitive time frame for purposes of synchronization, a real-time (RT) type of interrupt, as well as interprocessor interrupts for indicating an end of task or a request to start a task if prerequisites have been met.

Figure 6:
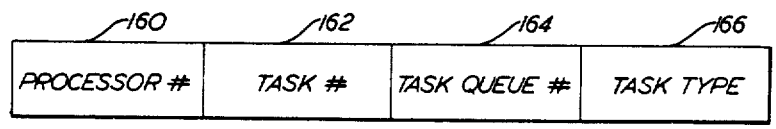
FIG. 6 is a pictorial representation of a task identifier associated with each of the real time interrupts as well as the interprocessor interrupts associated with the executive, according to the present invention.

A typical task identifier (ID) is shown in FIG. 6 and such an identification signal would be transmitted over the data lines to a processor in conjunction with an interrupt. First, the processor number, i.e., the processor designated for performing the task would be identified as indicated in a block 160 which may be any number of bits wide (parallel) or long (serial). Each task may be assigned a unique alphanumeric identifier as indicated in a block 162. A task queue number will also be assigned in a case where there is more than one queue, e.g., for either different task rates or different queues within a rate. This is indicated by a block 164 in FIG. 6. The task type will also be indicated in a block 166 in which the type of task to be accomplished is identified. The task types may include a pass-through for a data block, a request to start a task (if prerequisites are met), or an end of task signal.

Figure 3:
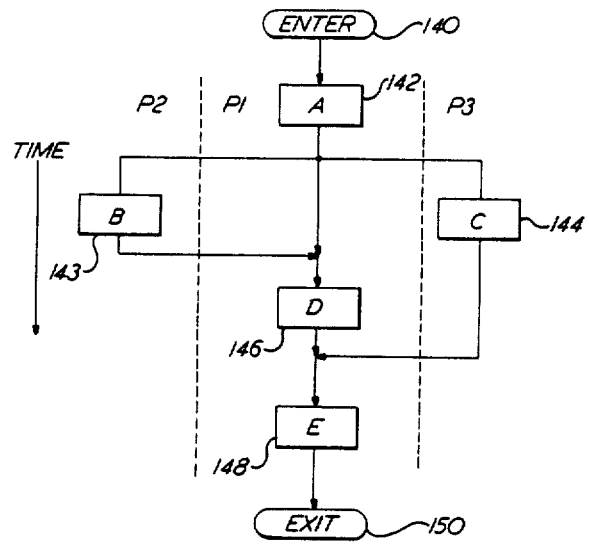
FIG. 3 is a simplified block diagram illustration of a precedence graph, showing a number of tasks to be executed in a number of processors and showing the interdependencies between the tasks.
Figure 4:
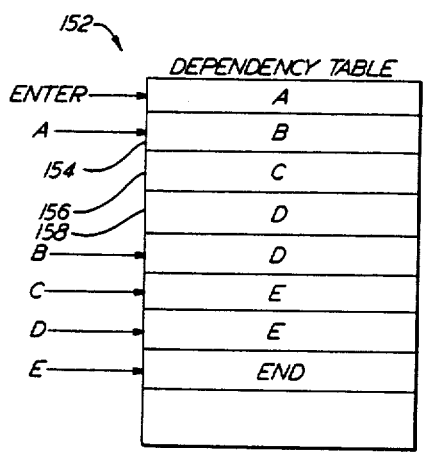
FIG. 4 is a pictorial representation of a dependency table showing each of the tasks of FIG. 3 and each of the dependent tasks relating to each.

FIG. 4 illustrates a dependency table 152 generated from the precedence graph of FIG. 3. Entries in the table contain the sets of task IDs, such as shown in FIG. 6, pertaining to those tasks that depend on a given task. The table is organized in such a way that the ID of a task points to the beginning of the set of dependent tasks. It can be seen that the completion of task A denoted by "A" at the left of the table leads to dependency table task ID entries for tasks B, C, and D at 154, 156, 158. Similar task ID entries are made for the other tasks in the precedence graph.

Figure 5:
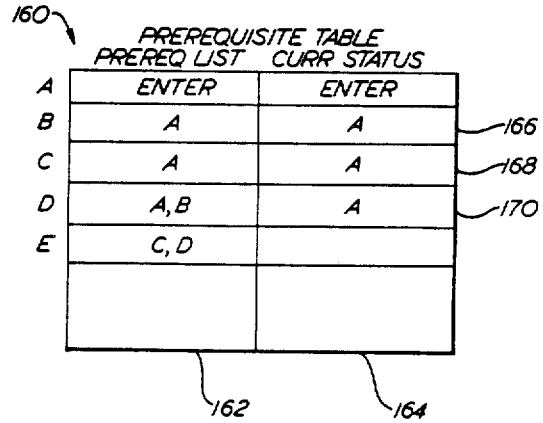
FIG. 5 is a pictorial representation of a prerequisite table showing a prerequisite list for each of the tasks of FIG. 3 and also showing a current status list for each of the prerequisites for each task.

Referring now to FIG. 5, a prerequisite table 160 is there illustrated. For each executable task listed in a column of executable tasks designated by a capital letter at the left of the table, the prerequisite table contains an entry for both a prerequisite list 162 and a current status list 164. The list of prerequisites for each executable task contain all of the other tasks which must be completed before the task in question can be initiated. This list may be generated at compile time and is based on the precedence graph of FIG. 3. A rule may be made that it cannot be changed during execution. Thus, for example, task D requires that tasks A and B must be completed first. The current status list is used to keep abreast of the status of prerequisites for any given task. In the illustration of FIG. 5, the current status list indicates that task A is completed, as indicated by entries 166, 168, 170 corresponding to tasks B, C and D, which depend on task A and for which task A is a prerequisite. Thus, this list represents those prerequisites which have been met in the current task frame associated with the task. This list is reinitialized using the list of prerequisites in the prerequisite, but that task B is not yet completed as indicated by the entry 170 list at the task rate.

Figure 7:
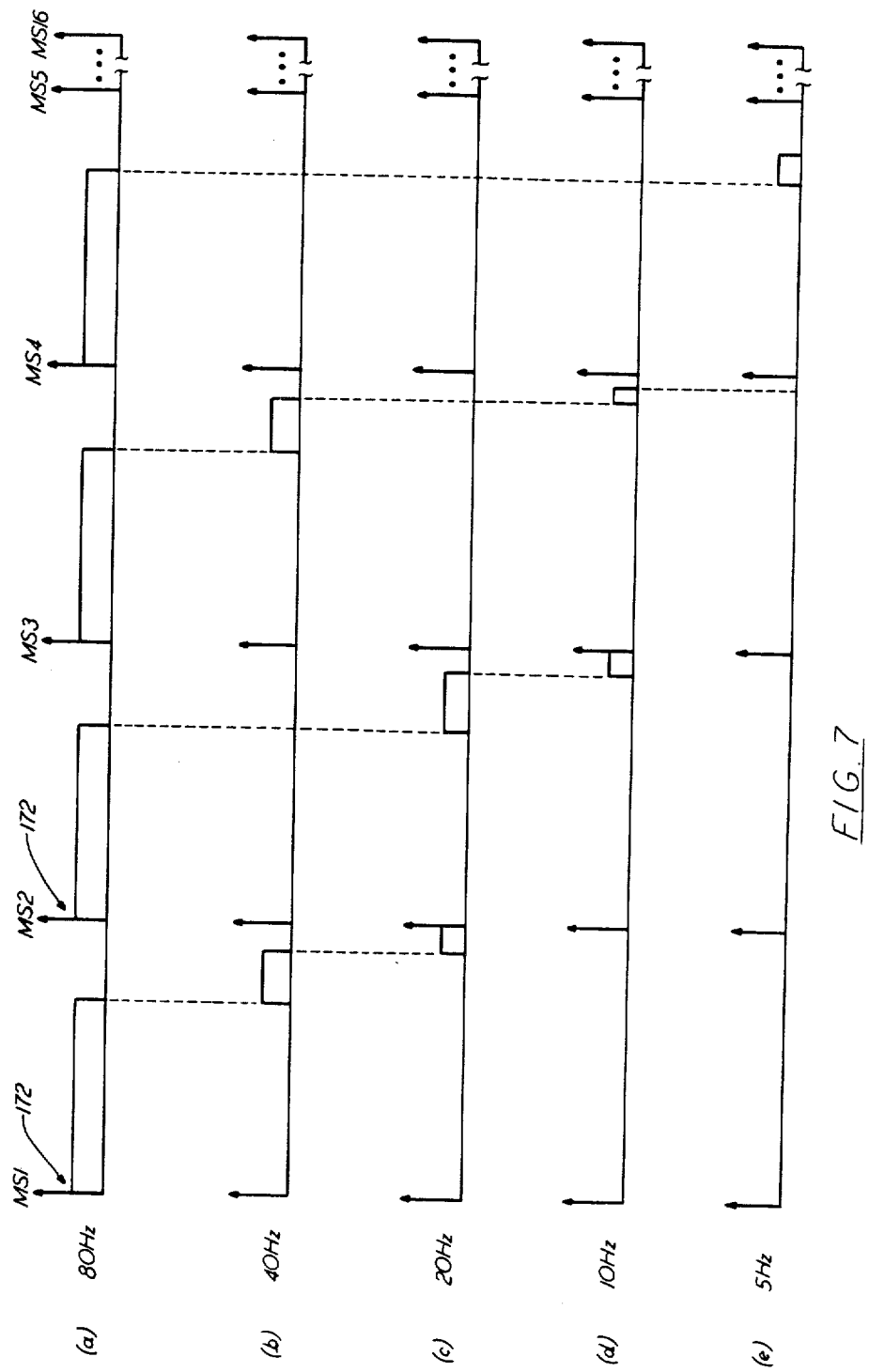
FIG. 7 is a pictorial representation of the operation of a multi-tasking hierarchical executive in which several tasks rates are operating at the same time.

There may be a number of task rates associated with a multi-tasking executive. Thus, a task which must be completed within a relatively short period of time, e.g., 12.5 milliseconds, will be repeated at an 80 Hertz rate. Tasks which do not have to be completed so quickly, e.g., at a 40 Hertz rate will be repeated every 25 milliseconds. As shown in FIG. 7, for a multi-tasking executive in which five different rates are going on at the same time there will be, in addition, for example, a 20 Hertz rate in which tasks associated with that rate are accomplished repetitively every 50 milliseconds as shown in FIG. 7(c). Similarily, at a 10 Hertz rate tasks are repeated every 100 milliseconds as shown in FIG. 7(d). For a 5 Hertz rate, as shown in FIG. 7(e), there will be a spacing of 200 milliseconds between repetition of those tasks. For each of the rates there will be at least one execution queue.

The five different task rates of FIG. 7 are each shown being synchronized by macrosync pulses 172 which are transmitted throughout the multiprocessor architecture to establish synchronism. For the five rates shown in FIG. 7, there will be sixteen repetitions of a 12.5 ms macrosync before the entire 5-rate task is completed once.

A task is entered into an execution queue when it completes it prerequisites. The number of execution queues will be greater than or equal to the number of different task rates. The reason for any additional queues within a given task rate is that in many cases, one set of tasks, e.g., the pitch axis computations for an avionic application, will be considered more time critical and, therefore, their overall transport delay must be minimized. The additional task queues will, therefore, be provided for parallel execution.

Figure 8:
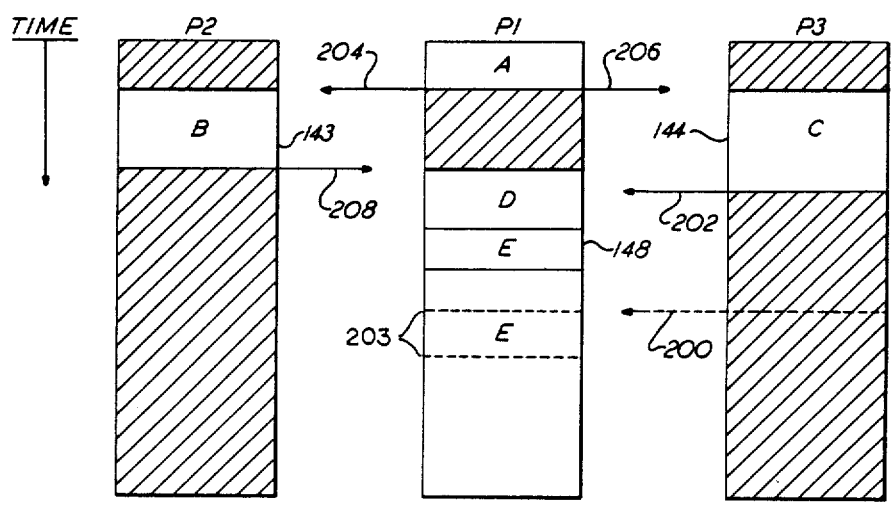
FIG. 8 is a pictorial representation of an execution sequence illustrating the execution of the tasks illustrated in FIG. 3.

FIG. 8 illustrates the execution sequence for the precedence graph of FIG. 3 in relation to the times for executing each task. As shown, tasks 143 (B) and 144 (C) are performed in processors P2 and P3 and the remaining tasks are performed in processor P1. The shaded areas indicate time unused or used by other processor tasks. Notice that if task 144 (C) takes too long, as shown by a dashed end of task interrupt line 200, task 148 (E) would be significantly delayed, as shown by dashed lines 203, as would the earlier end of task interrupt 202.

Additional interrupts 204, 206 signify to adjacent processors the end of task "A" while another interrupt 208 signifies the end of task B to processor P1.

The operation of the task executive can be described as "event" or "interrupt" driven. Only the following three basic types of events need to be considered:

(1) End of task interrupts,
(2) Pass through interrupts, and
(3) Start request interrupts.

When a processor receives an end of task interrupt, it uses the task ID as shown in FIG. 6 to locate the set of dependent tasks in the dependency table as shown in FIG. 4. Each dependent task ID and its associated prerequisite criteria is then used to update the current status of prerequisites in the prerequisite table as shown in FIG. 5. If all prerequisites for a task are met, the task is placed on the appropriate execution queue using its task queue number block in the task ID. The set of all dependent tasks are processed by the executive in this manner before exiting from this overhead work. For the example of FIGS. 3, 4, 5, and 8, the end of task interrupt 202 issued by processor P3 to processor P1 at the completion of task 144 (C) would result in the updating of the prerequisite table's current status list for task E. If some task were directly dependent upon the completion of task C, and only task C, then the end of task interrupt issued by task C would result in the scheduling of that task in the appropriate processor's execution queue.

There will be cases where an interrupt will have to cross more than one processor boundary. For example, a task in processor P3 could be a prerequisite for a task in processor P2. In that event, the interrupt from P3 would have to "pass through" P1. A pass through interrupt and updated data is provided to P1 for relay to P2. P1 would respond to this interrupt and data by using the associated task ID to determine the source and destination of the data block. The end of task interrupt and data would then be provided to P2 for execution. The dependency table may or may not include an entry of the pass through task(s). The dependency tables shown in FIG. 4 do not include such an entry because it is directly and most rapidly handled by the interrupt service routine itself.

In case of data blocks which may be used locally, as well as passed through to another processor, two possible approaches need to be traded off. The first involves not classifying the task as a pass-through, but as an end of task signal and operating as described above. The alternate involves performing the pass-through task as described above and then setting an event flag so that the data block can be used locally using the dependency and prerequisite tables. The latter approach may be preferred since the requesting processor cannot always determine whether or not a data block is only being passed through.

A start request interrupt may be used to request a processor to start a task, specified by the task ID, regardless of its prerequisites. This interrupt may be used to initiate tasks that have no prerequisites, e.g., real time and macrosync (MS) interrupts. These interrupts can be handled as end of task interrupts as well. However, a mechanism is sometimes needed to start a task in another processor regardless of what it was doing.

Figure 11:
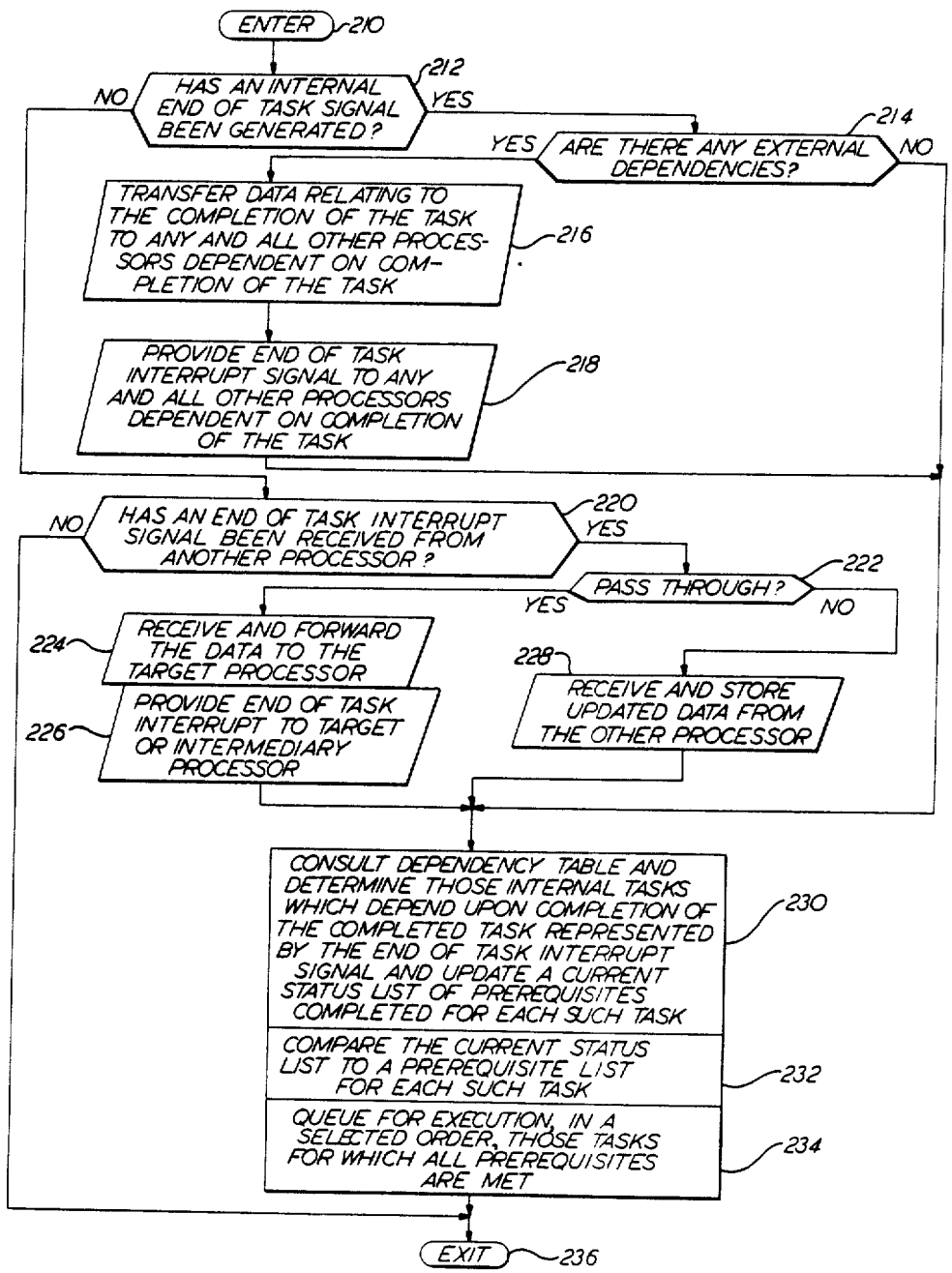
FIG. 11 is a simplified flow chart illustration of a series of logical steps which may be carried out in implementing a task executive for a multiprocessor system, according to the present invention.

Referring now to FIG. 11, a simplified flow chart illustration shows a series of logical steps which may be implemented in carrying out the tasks illustrated in FIGS. 3, 4, 5 and 8.

After entering at a step 210, a decision step 212 is next executed in which a determination is made as to whether an internal end of task signal has been generated. If so, a decision step 214 is next executed in which a determination is made as to whether or not there are any external dependencies depending on the completion of the indicated task. If so, a step 216 is next executed in which data relating to the completion of the task is transferred to any and all other processors dependent on completion of the task. An end of task interrupt signal may then be provided, as indicated in a step 218, to any and all other processors dependent on completion of the task. Tasks 218 and 216 could be interchanged but the transfer of data first is the preferred technique since coherency can be ensured if the end of task interrupt is sent only after data transfer is complete. Such an approach would be based on not permitting the destination processor to access data until it has received the end of task interrupt.

If it had been determined in step 212 that there had been no internal end of task signal generated, then a step 220 would next have been executed in which a determination is made as to whether or not an end of task interrupt signal has been received from another processor. If so, a step 222 is next executed in which a determination is made as to whether or not the end of task signal represents a pass-through of data intended for another processor. If it is a pass-through, then a step 224 is next executed in which the pass-through data is received and forwarded to the target processor. This of course may be by way of a "chain" of processors and memory storage areas, much like a "bucket brigade."

Of course, the end of task interrupt must also be transmitted to the target processor or to the intermediary processor, as indicated in a step 226.

At the conclusion of step 226 or, if it had been determined in step 222 that there had been no request for a pass-through, then a step 228 is next executed in which updated data from another processor is received and stored.

After step 228 is completed or, after step 218 is completed or, if it had been determined in step 214 that there were no external dependencies, then a step 230 is next executed in which a dependency table is consulted to determine those internal tasks which depend upon completion of the completed task as represented by the just received end of task interrupt signal. The current status list of prerequisites completed is then updated for each such task. The current status list is then compared to the prerequisite list for each such task, as indicated in a step 232. Those tasks for which all prerequisites are met are then queued for execution, in a selected order, as indicated in a step 234.

After completion of step 234 or, if it had been determined in step 220 that there had been no end of task interrupt signal received from another processor, then an exit is made as indicated in a step 236.

Figure 9:
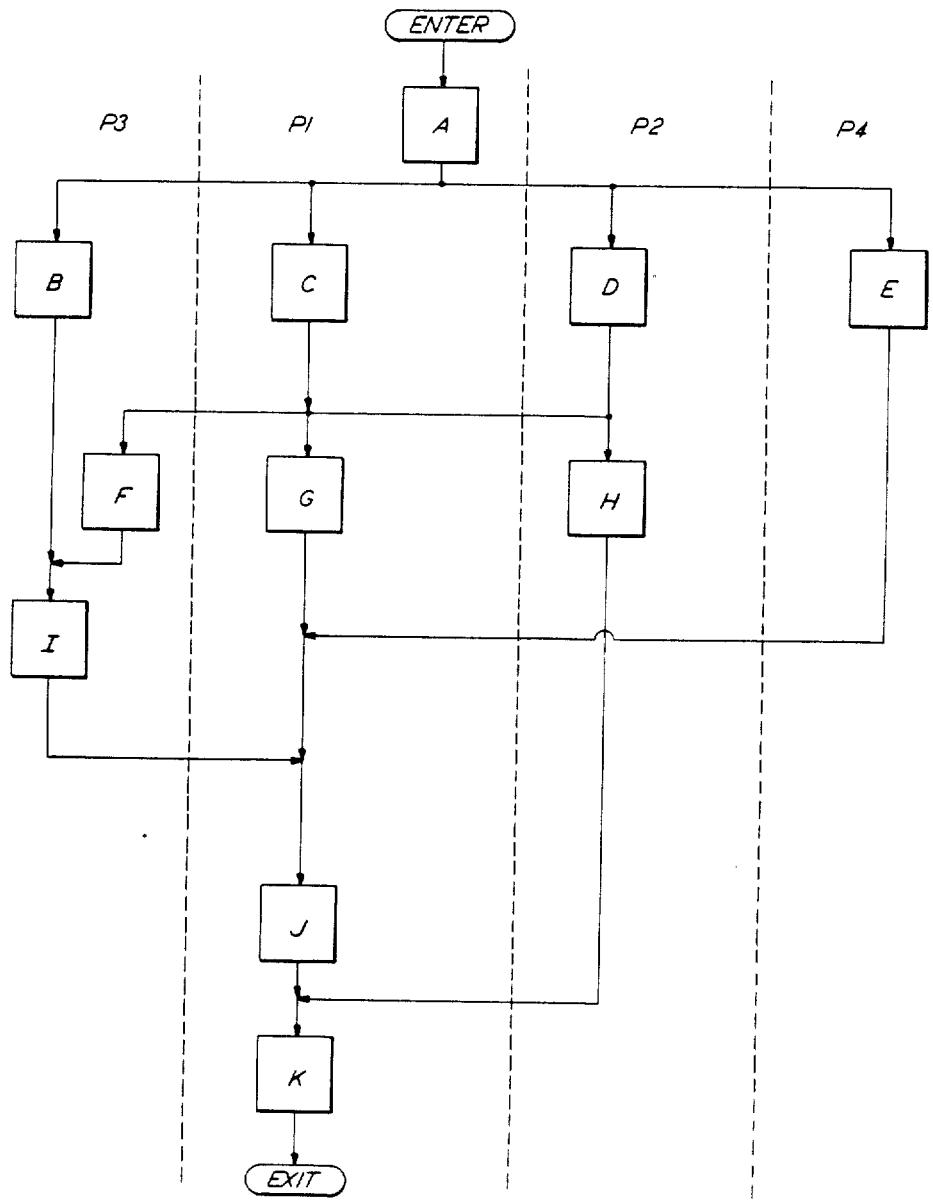
FIG. 9 is an illustration of a second precedence graph for a second multiprocessor system.
Figure 10:
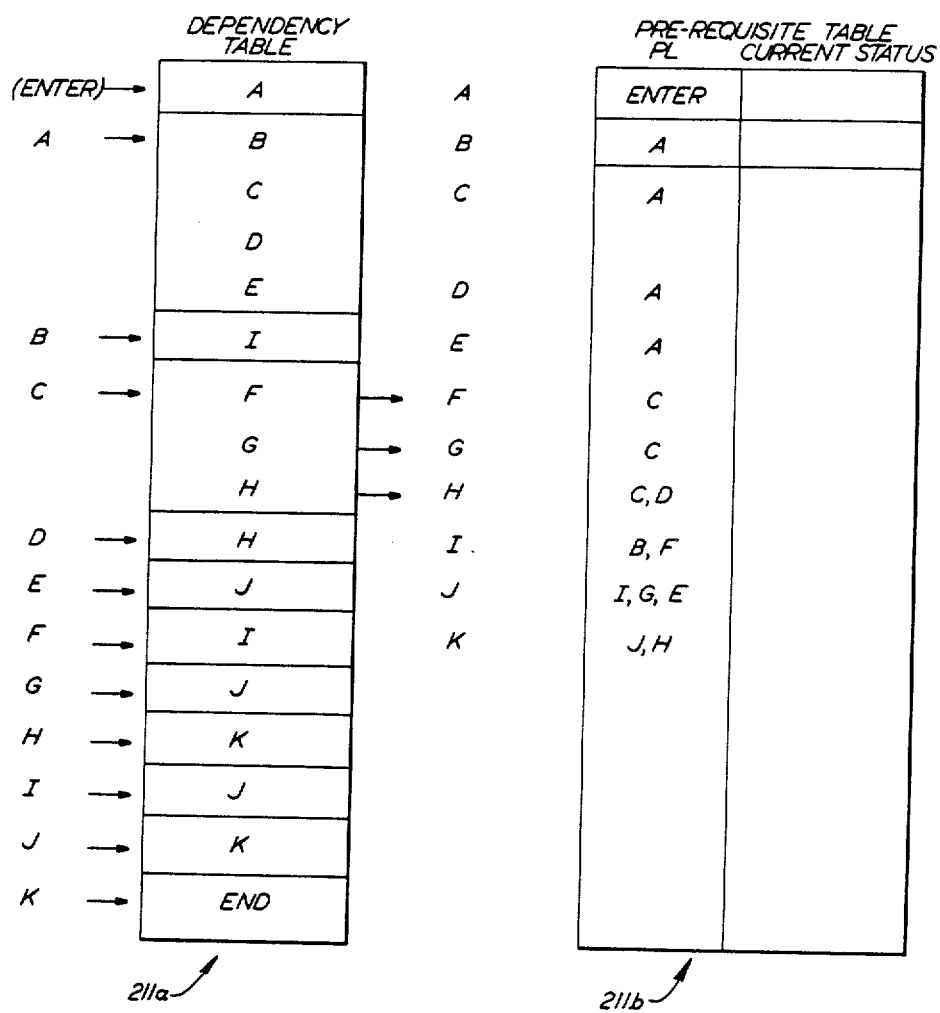
FIG. 10 illustrates a dependency table and a prerequisite table for the precedence graph of FIG. 9.

Another example of a precedence graph for a task executive is shown in FIG. 9. This example is slightly more complex than the example shown in FIG. 3. The tasks in FIG. 9 are distributed among four processors, P3, P1, P2, P4. The tasks are illustrated, as in FIG. 3, as being vertically partitioned between the four processors. This method of pictorial representation has no special significance other than to indicate a separation of processors into separate and distinct signal processing elements. Dependency and prerequisite tables 211a, 211b corresponding to the graph of FIG. 9 are shown in FIG. 10.

As with FIG. 3, when a processor receives an end of task interrupt it uses the task ID to locate the set of dependent tasks in the dependency table. Each dependent task ID and its associated prerequisite criteria is used to update the current status list of prerequisites in the prerequisite table. If all prerequisites are met, the task is placed on the appropriate execution queue giving its task ID. The set of all dependent tasks are processed in this manner before exiting from this task. For the example of FIGS. 9 and 10, the dependency and prerequisite tables indicate that the end of task interrupt issued by task C would result in the scheduling of task F and G in the appropriate processor execution queues and the updating of the prerequisite status of task H.

As before, with regard to interrupts and/or data which must cross processor boundaries, a pass-through interrupt is provided. Again, a processor will respond to this interrupt by using the associated task ID to determine the source and destination of the data block. The task is performed within an interrupt service routine in order to achieve the highest throughput rate for pass through tasks.

For a more detailed example of a pass-through than given before, as seen in the precedence graph of FIG. 9, the completion of task E in processor P4 requires a pass-through interrupt to processor P2 in order to complete the prerequisites of task J in processor P1. The task completion interrupt and updated data is provided to P2 by P4 and results in the scheduling of the pass though task. P2 interrupts processor P1 and transfers the necessary data to P1. Processor P1 uses this interrupt from P2 to update the prerequisite table's current status list for task J. Again, note that the dependency table does not include an entry of the pass-through task(s) because these tasks are more efficiently handled in the interrupts via a look-up table, not shown.

Again, the comments with respect to data blocks which may be used locally, as well as passed through to another processor, as made previously with respect to FIG. 3, apply here as well.

The disclosure made previously with respect to FIG. 3 concerning start request interrupts is also applicable with regard to FIG. 9.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method of controlling the execution of a plurality of data-interdependent tasks in at least one signal processor, comprising:

determining the order in which said tasks may be executed so that any one of said tasks dependent on data to be provided by any other ones of said tasks will be executed only after completion of said other ones of said tasks, establishing a stored dependency table indicative, for each of said other tasks, of any one of said tasks dependent on such other tasks, and establishing a stored prerequisite table including a prerequisite list indicative, for any one of said tasks, of any of said other tasks on which said one task is dependent and a corresponding current status list indicative of whether or not each of said other tasks in said prerequisite list has been completed, any of said tasks which is not dependent on any of said other ones of said tasks having an immediate enter status associated therewith in said dependency table and in both lists of said prerequisite table;

executing, first, any of said tasks which is not dependent on any of said other ones of said tasks, as indicated by said immediate enter status, and to said dependency table a corresponding completion of execution of each such task, issuing an end of task signal;

in response to each of said end of task signals, determining from said dependency table each of said tasks dependent on the task issuing said end of task signal and, for each dependent task so determined, entering into the corresponding portion of said current status list, as determined by said prerequisite list, an indication that the task issuing said end of task signal has been completed; and queuing, for execution in a selected order, each task for which said status list indicated completion of every corresponding task in said prerequisite list.

2. A method according to claim 1 for controlling the execution of a plurality of data-independent tasks in a plurality of signal processors, comprising:

establishing in each given one of said signal processors, a stored table of task identifiers indicative, for each task dependent on any of said other tasks to be executed in said given signal processor, of the identity of said dependent task and the specific one of said signal processors within which said dependent task is to be executed;

said end of task signal comprising an end of task interrupt signal issued from said given signal processor and received by said specific signal processor; and in response to an end of task interrupt signal relating to any one of said other tasks in said given signal processor, transferring, from said given signal processor to said specific signal processor, the data resulting from completion of such one of said other tasks in said given signal processor related to said dependent task.

3. A method according to claim 2 for controlling the execution of a plurality of data-interdependent tasks in at least three signal processors, comprising:

establishing, in one of said tables of task identifiers in at least one of said given signal processors, an indication of the fact that one of said tasks, to be executed in a certain one of said specific signal processors other than said given signal processor, is a data block pass-through task, execution of which will pass a block of data from said given signal processor through said certain specific signal processor to a third one of said signal processors;

establishing, in one of said tables of task identifiers in said certain specific signal processor, an indication that a task related to said data block pass-through task is to be executed in said third signal processor;

queuing said data block pass-through task for execution in said certain specific signal processor in response to receipt by said certain specific signal processor of said end of task interrupt related to said data block pass-through task from said given signal processor; and issuing from said certain specific signal processor an end of task interrupt signal to said third signal processor in response to completion of said data block pass-through task in said certain specific signal processor.

* * * * *